(12) United States Patent
Nakashima et al.

(10) Patent No.: US 8,281,498 B2
(45) Date of Patent: Oct. 9, 2012

(54) EVAPORATOR, EVAPORATION METHOD AND SUBSTRATE PROCESSING APPARATUS

(75) Inventors: Mikio Nakashima, Tosu (JP); Yuji Kamikawa, Tosu (JP)

(73) Assignee: Tokyo Electron Limited, Tokyo (JP)

( * ) Notice: Subject to any disclaimer, the term of this patent is extended or adjusted under 35 U.S.C. 154(b) by 344 days.

(21) Appl. No.: 12/553,161

(22) Filed: Sep. 3, 2009

(65) Prior Publication Data
US 2010/0058606 A1    Mar. 11, 2010

(30) Foreign Application Priority Data

Sep. 5, 2008   (JP) ................. 2008-228752

(51) Int. Cl.
F26B 5/00 (2006.01)
F26B 5/16 (2006.01)
B01D 1/02 (2006.01)
B01D 1/30 (2006.01)
(52) U.S. Cl. .............. 34/72; 34/73; 34/74; 34/77; 34/78
(58) Field of Classification Search ............... 34/218, 34/72, 73, 74, 78, 77; 165/104.21; 422/528, 422/529, 530; 118/726; 392/395
See application file for complete search history.

(56) References Cited

U.S. PATENT DOCUMENTS

| | | | | |
|---|---|---|---|---|
| 1,793,174 A | * | 2/1931 | Hofmeister et al. | ......... 159/13.3 |
| 5,289,698 A | * | 3/1994 | Garimella | ................ 62/498 |
| 6,167,323 A | | 12/2000 | Komino et al. | |
| 2006/0143937 A1 | * | 7/2006 | Eichler | .......................... 34/351 |
| 2006/0257662 A1 | * | 11/2006 | Bujard et al. | ................ 428/404 |
| 2007/0017502 A1 | | 1/2007 | Kamikawa et al. | |
| 2009/0101186 A1 | | 4/2009 | Hiroshiro et al. | |

FOREIGN PATENT DOCUMENTS

| | | | |
|---|---|---|---|
| JP | 02-185031 A | | 7/1990 |
| JP | 07269988 A | * | 10/1995 |
| JP | 09105575 A | * | 4/1997 |
| JP | 09-159337 A | | 6/1997 |
| JP | 2002-267102 A | | 9/2002 |
| JP | 2007-017098 A | | 1/2007 |
| JP | 20075479 A | | 1/2007 |
| JP | 200717098 A | | 1/2007 |

* cited by examiner

Primary Examiner — Jiping Lu
(74) Attorney, Agent, or Firm — Abelman, Frayne & Schwab

(57) ABSTRACT

Disclosed are an evaporator, an evaporation method, and a substrate processing apparatus, which can increase the concentration of generated vapor of an organic solvent and efficiently heat the organic solvent. The evaporator includes a fluid tube, a liquid organic solvent supply device for supplying the organic solvent liquid to one end of the fluid tube, and heating units for heating the fluid tube. The fluid tube has a cross section that increases from the one end to the other end. When the organic solvent liquid supplied to one end of the fluid tube is heated, the organic solvent vapor is discharged from the other end of the fluid tube. The substrate processing apparatus includes the above-described evaporator.

11 Claims, 5 Drawing Sheets

EVAPORATOR, EVAPORATION METHOD AND SUBSTRATE PROCESSING APPARATUS

This application is based on and claims priority from Japanese Patent Application No. 2008-228752, filed on Sep. 5, 2008 with the Japanese Patent Office, the disclosure of which is incorporated herein in its entirety by reference.

TECHNICAL FIELD

The present invention relates to an evaporator, an evaporation method, and a substrate processing apparatus, which evaporate a volatile organic solvent, such as isopropyl alcohol (IPA), and more particularly to an evaporator, an evaporation method, and a substrate processing apparatus, which can increase the concentration of the generated organic solvent vapor and efficiently heat the organic solvent.

BACKGROUND

In general, a fabricating process by a semiconductor fabrication apparatus mainly employs a washing method in which a semiconductor wafer or a substrate, such as glass for LCD (hereinafter, referred to as a 'wafer'), is successively immersed in a washing tank containing a washing solution, such as a chemical solution or a rinse solution. In addition, a drying method is known that includes the application of vapor, produced from a volatile organic solvent (e.g. isopropyl alcohol (IPA)), to a washed wafer surface, where the vapor is condensed or adsorbed, and the provision of an inert gas, such as N2 gas (nitrogen gas), to the wafer surface to remove and dry the moisture on the surface (for example, refer to Japanese Laid-Open Patent No. 2007-5479).

In the drying method described above, when the vapor of the organic solvent is supplied to a chamber housing a wafer, an evaporator is used that generates the organic solvent vapor by evaporating the liquid of the organic solvent by applying heat. For example, Japanese Laid-Open Patent No. 2007-17098 discloses the aforementioned evaporator.

A conventional evaporator disclosed in Japanese Laid-Open Patent No. 2007-17098 includes a heat source lamp, such as a halogen lamp, and a helical fluid tube surrounding the heat source lamp, in which the fluid of an organic solvent to be heated flows. The liquid of the organic solvent flows in the helical fluid tube, and is heated through the heating of the fluid tube by the heat source lamp, thereby generating the vapor of the organic solvent within the fluid tube.

In a conventional evaporator disclosed in Japanese Laid-Open Patent No. 2007-17098, organic solvent liquid is mixed with an inert gas, such as N2 gas, and the mixed fluid of the organic solvent liquid and the inert gas is then sent to a fluid tube. Herein, the inert gas functions as a carrier gas. However, in such an evaporator, since the organic solvent liquid sent to the fluid tube includes an inert gas, a problem exists in that the organic solvent is diluted by the inert gas, and the concentration of the organic solvent vapor generated within the fluid tube become lower.

SUMMARY

According to one embodiment, an evaporator for generating the vapor of an organic solvent is provided. The evaporator includes a fluid tube, a liquid organic solvent supply device for supplying the liquid organic solvent to one end of the fluid tube, and a heating unit for heating the fluid tube. The fluid tube has a cross section that increases from one end to the other end. The liquid organic solvent is supplied to one end of the fluid tube and is heated to allow the vapor of the organic solvent to be discharged from the other end of the fluid tube.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
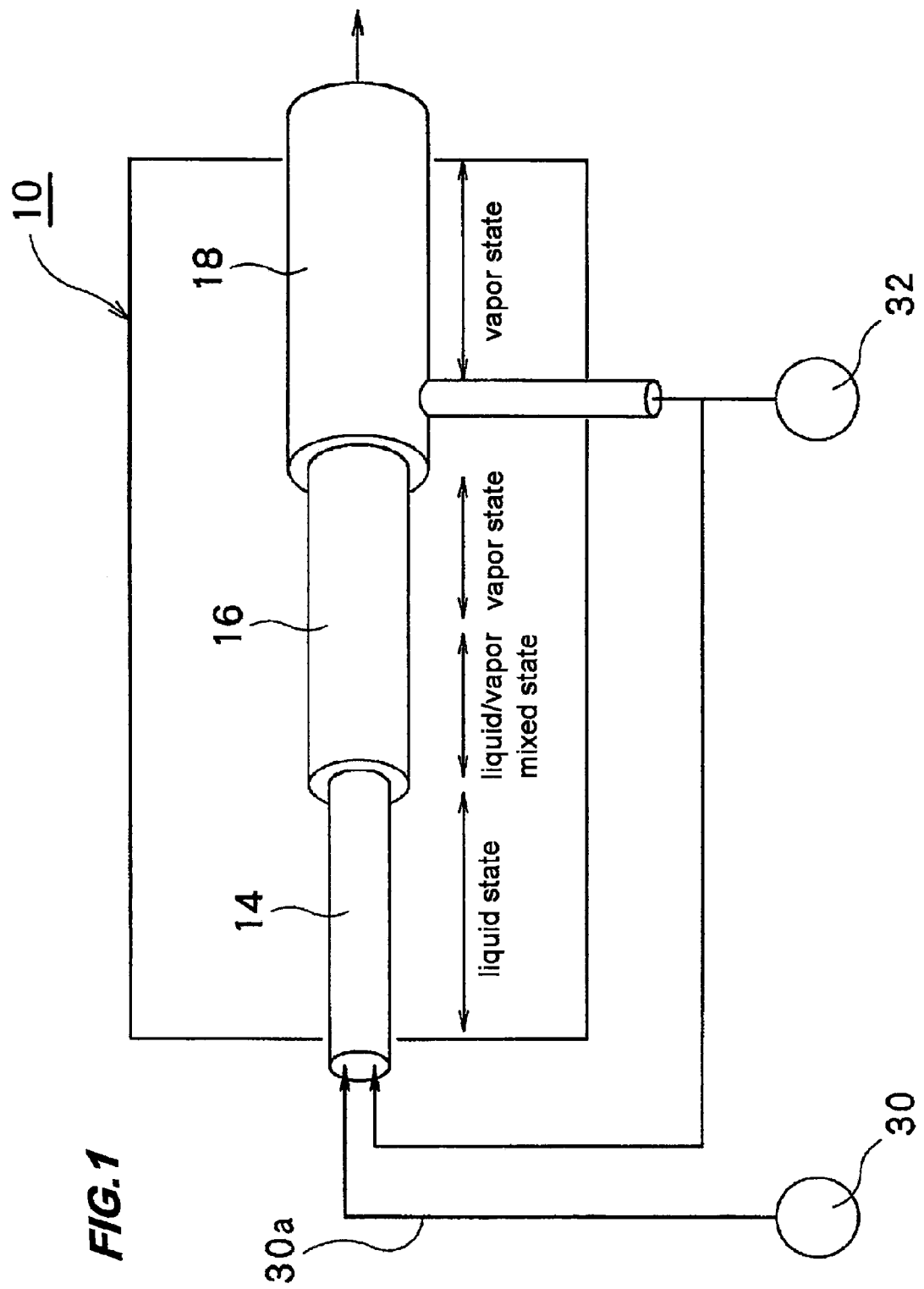
FIG. 1 schematically illustrates an evaporator according to one embodiment of the present invention.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

The present invention provides an evaporator and an evaporation method designed to increase the concentration of organic solvent vapor generated within the fluid tube by preventing the inert gas from mixing with the liquid organic solvent. According to the evaporator and the evaporation method of the present invention, the fluid tube has a cross section that increases from one end to the other (that is, from the upstream to downstream side), and thus the organic solvent liquid, unmixed with the inert gas, is evaporated within the fluid tube. Even though the volume of the organic solvent increases, it is possible to improve the thermal efficiency in various states (in the liquid state, the mixed state of liquid and vapor, and the vapor state). Therefore, the present invention provides an evaporator and an evaporation method capable of efficiently heating the organic solvent.

The present invention provides a substrate processing apparatus capable of shortening the drying time of the substrate and reducing the usage amount of the organic solvent. This is achieved by drying the substrate with a high concentration of the organic solvent vapor generated by the evaporator, which increases its adsorption rate on the substrate.

According to one embodiment, an evaporator for generating the vapor of an organic solvent is provided. The evaporator includes a fluid tube, a liquid organic solvent supply unit for supplying the liquid of the organic solvent to one end of the fluid tube, and a heating unit for heating the fluid tube. The fluid tube has a cross section that increases from one end to the other end. The liquid of the organic solvent is supplied to one end of the fluid tube and is heated to allow the organic solvent vapor to discharge from the other end of the fluid tube.

In such an evaporator, since the liquid organic solvent supplied to one end of the fluid tube is not mixed with an inert gas, the concentration of the organic solvent vapor generated within the fluid tube can be increased. Moreover, the fluid tube is configured in such a manner that its cross section increases from one end to the other end, that is, from the upstream to the downstream side. Thus, even when the liquid organic solvent which is not mixed with inert gas evaporates and increases in volume within the fluid tube, the thermal efficiency of the organic solvent can be maximized in various states (the liquid state, the mixed state of liquid and vapor, and the vapor state). Accordingly, it is possible to efficiently heat the organic solvent.

In one embodiment, the fluid tube may have a first fluid tube part with a first cross section, and a second fluid tube part with a second cross section larger than the first cross section. The organic solvent may include isopropyl alcohol and the fluid tube may have a helical shape, in this embodiment.

In another embodiment, the evaporator may further include an inert gas supply device for supplying an inert gas to the fluid tube. The organic solvent vapor and the inert gas in a mixed state can be discharged from the end of the fluid tube. The inert gas may be nitrogen gas. Herein, when the organic solvent vapor is condensed on the substrate, the volume of the organic solvent will reduce, thereby suddenly lowering the internal pressure of the drying chamber. When the pressure is suddenly lowered, it is necessary to make the drying chamber and chamber internal members strongly resistant to pressure changes. However, according to the above-described evaporator, the mixing of the organic solvent vapor with a predetermined amount of inert gas inhibits the sudden pressure lowering caused by the condensation of the organic solvent.

In another embodiment, the evaporator may further include a purging inert gas supply device for supplying the inert gas to the one end of the fluid tube. The inert gas supplied from the purging inert gas supply device to the fluid tube discharges the remaining organic solvent from the other end of the fluid tube. The inert gas may be nitrogen gas. In such an evaporator, after generating the organic solvent vapor through evaporation, the inert gas is supplied to one end of the fluid tube, and the remaining organic solvent is discharged from the other end of the fluid tube by the inert gas. Therefore, after the evaporator finishes generating the organic solvent vapor, the inside of the fluid tube may be clean.

The heating unit may include a lamp heater, an induction-heating type heater, or a resistance-heating type heater.

In another embodiment, the evaporation method for generating the organic solvent vapor includes preparing a fluid tube which has a cross section that increases from one end to the other, supplying organic solvent liquid to one end of the fluid tube, and evaporating the organic solvent liquid by heating the fluid tube, thereby discharging the organic solvent vapor.

In this evaporation method, since the organic solvent liquid supplied to one end of the fluid tube is not mixed with an inert gas, the concentration of the organic solvent vapor generated within the fluid tube can be increased. Moreover, the fluid tube is configured in such a manner that its cross section increases from one end to the other end, that is, from the upstream to the downstream side. Thus, even as organic solvent liquid not mixed with an inert gas are heated and evaporates, and its volume expands within the fluid tube, the thermal efficiency can be maximized in various states (the liquid state, the mixed state of liquid and vapor, and the vapor state). Accordingly, it is possible to efficiently heat the organic solvent.

The organic solvent may include isopropyl alcohol and the organic solvent vapor may be discharged from the other end of the fluid tube in a mixed state with the inert gas by supplying the inert gas to the fluid tube. Herein, when the organic solvent vapor is condensed on the substrate, the volume of the organic solvent may suddenly reduce, thereby lowering the internal pressure of the drying chamber. When the pressure is suddenly lowered, it is necessary to make the drying chamber and chamber internal members strongly resistant to pressure changes. However, according to the above-described evaporation method, mixing of the organic solvent vapor with a predetermined amount of inert gas may inhibit the sudden pressure lowering caused by the condensation of the organic solvent.

The inert gas may be supplied to one end of the fluid tube, discharging the organic solvent remaining within the fluid tube from the other end of the fluid tube, after evaporating the organic solvent liquid and generating the organic solvent vapor. Therefore, according to the evaporation method, after generating the organic solvent vapor, the inside of the fluid tube may be clean.

In another embodiment, a substrate processing apparatus for processing a substrate is provided. The substrate processing apparatus includes the above-described evaporator, and a chamber for receiving the substrate and drying the received substrate. The chamber is supplied with organic solvent vapor generated by the evaporator. In such a substrate processing apparatus, by increasing the concentration of organic solvent vapor generated by the evaporator, the adsorption rate of organic solvent vapor on the substrate increases. Thus, the drying time of the substrate may be shortened, thereby reducing the usage amount of the organic solvent.

According to the evaporator and evaporation method of the present invention, the concentration of generated organic solvent vapor can be increased and the organic solvent can be heated efficiently.

In addition, according to the substrate processing apparatus of the present invention, the adsorption rate of organic solvent vapor on the substrate increases. Thus, the drying time of the substrate may be shortened, thereby reducing the usage amount of the organic solvent.

Figure 2:
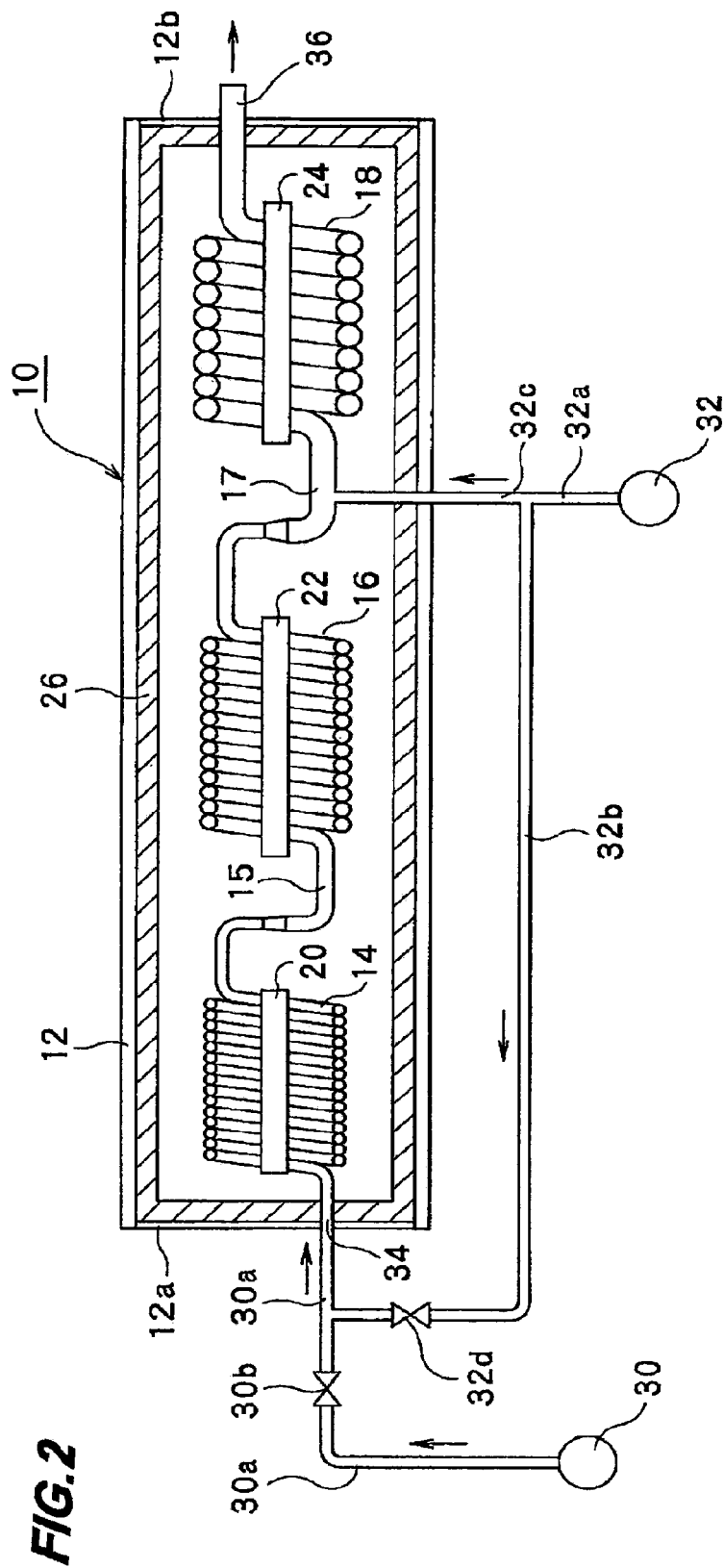
FIG. 2 shows the configuration of the evaporator as shown in FIG. 1.
Figure 3:
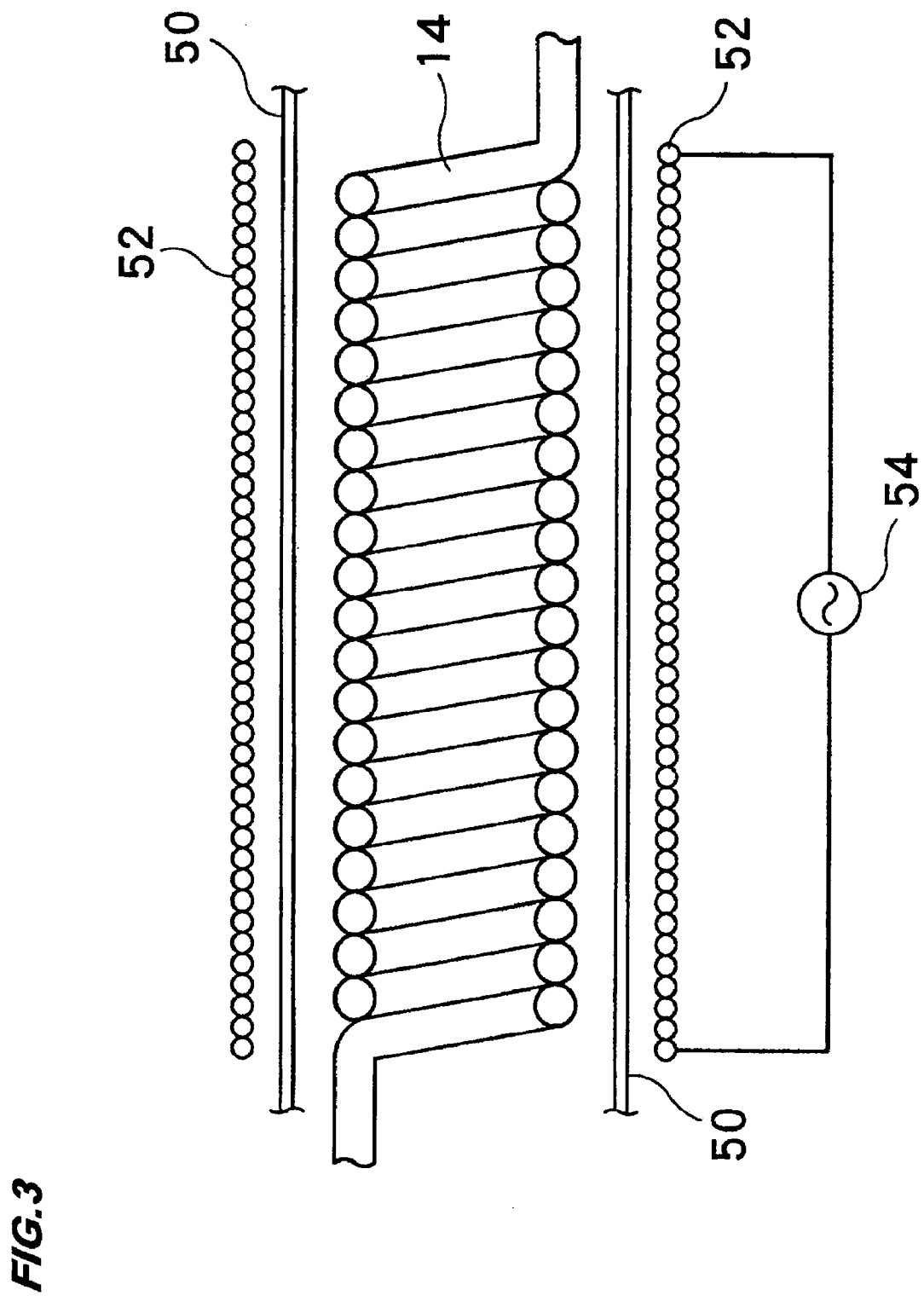
FIG. 3 schematically illustrates another configuration of a heating unit of the evaporator according to the present embodiment.
Figure 4:
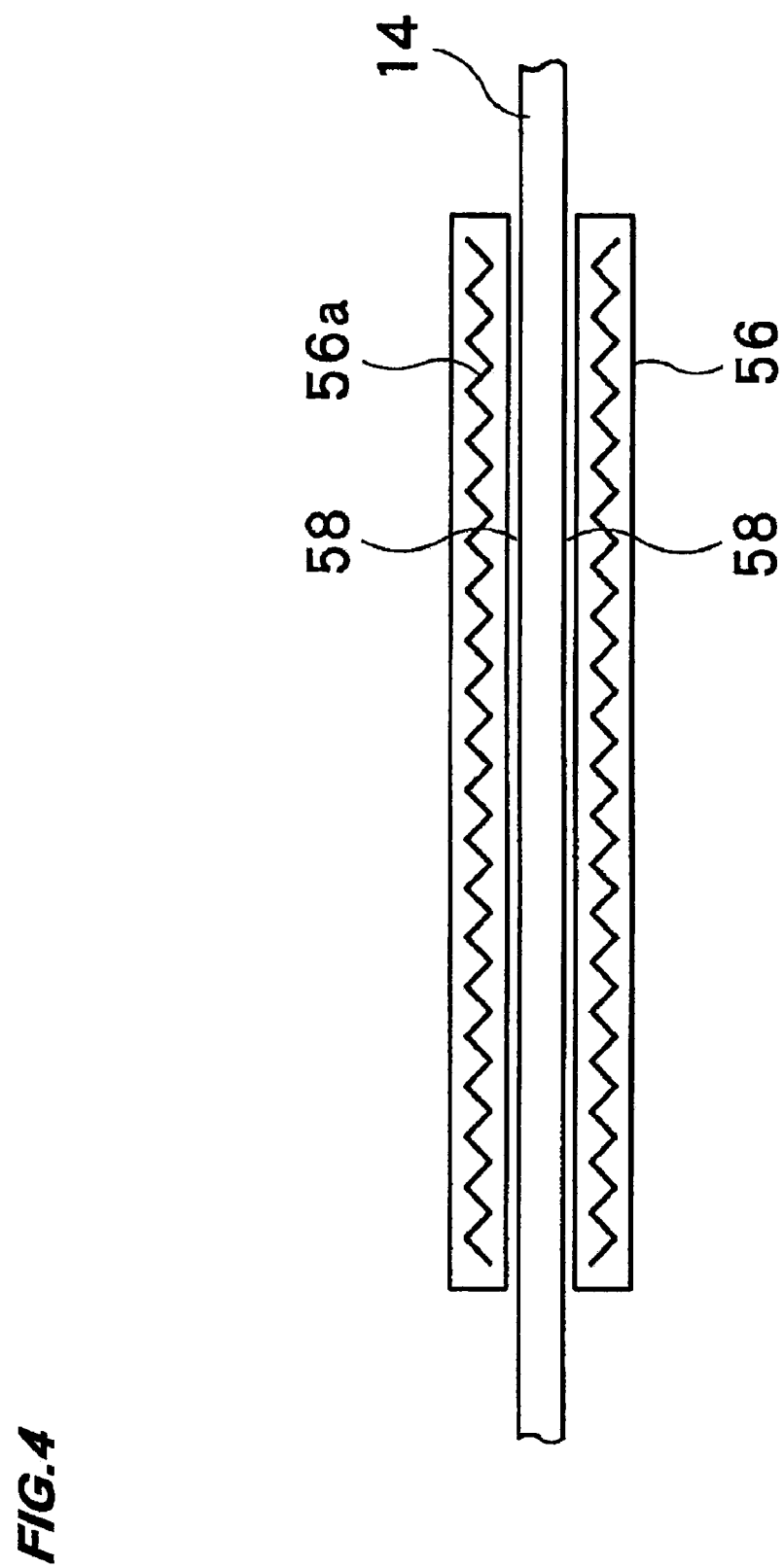
FIG. 4 schematically illustrates a still another configuration of a heating unit of the evaporator according to the present embodiment.

Hereinafter, an illustrative embodiment of the present invention will be described with reference to the accompanying drawings. First, an evaporator according to the present embodiment will be described in detail. Herein, FIG. 1 through 4 show an evaporator according to the present embodiment. Specifically, FIG. 1 schematically illustrates the evaporator according to the present embodiment, and FIG. 2 shows the configuration of the evaporator as shown in FIG. 1. FIG. 3 schematically illustrates another configuration of a heating unit of the evaporator according to the present embodiment, and FIG. 4 schematically illustrates a further configuration of a heating unit of the evaporator according to the present embodiment.

An evaporator 10 according to the present embodiment evaporates the liquid of a volatile organic solvent, such as isopropyl alcohol (IPA), by applying heat, thereby generating the organic solvent vapor. As shown in FIG. 2, evaporator 10 includes a cylindrical vessel 12, and fluid tubes 14, 16, and 18 provided within cylindrical vessel 12, through which flows the organic solvent to be heated. Halogen lamp heaters (heating units) 20, 22, and 24 for heating fluid tubes 14, 16, and 18, respectively, are provided within cylindrical vessel 12. Hereinafter, respective elements of evaporator 10 will be described in detail.

As shown in FIG. 2, three fluid tubes 14, 16, and 18 are arranged in-line within cylindrical vessel 12 of evaporator 10. A connecting pipe 15 is provided between fluid tubes 14 and 16, and a connecting pipe 17 is provided between fluid tubes 16 and 18.

Each of the fluid tubes 14, 16, and 18 surrounds corresponding halogen lamp heaters 20, 22, and 24. Fluid tubes 14, 16, and 18 have a helical shape, the center of which approximately coincides with the center of halogen lamp heaters 20, 22, and 24. The shapes of fluid tubes 14, 16, and 18 are not limited to a helical shape, and the fluid tubes may have an extending straight-line type shape. Each of the fluid tubes 14, 16, and 18 may be made of stainless steel. Herein, three fluid tubes 14, 16, and 18 are disposed in order from the upstream to downstream end. The organic solvent liquid is supplied to fluid tube 14, and then flows from fluid tube 14 to fluid tube 16, and fluid tube 18 in order (in other words, the organic solvent liquid flows from the left side to the right side in FIG. 2). Herein, halogen lamp heaters 20, 22, and 24 heat fluid tubes 14, 16, and 18, respectively, and thereby the organic solvent liquid evaporates into the organic solvent vapor. Then, the organic solvent vapor is discharged from fluid tube 18.

Among three fluid tube 14, 16, and 18, fluid tube 14 in the most upstream side has a smaller diameter than fluid tube 16, connected to the downstream end of fluid tube 14. Also, fluid tube 16, connected to fluid tube 14, has a smaller diameter than fluid tube 18, connected to the downstream side of fluid tube 16. More specifically, for example, fluid tube 14 has a diameter of about ⅛ inch, fluid tube 16 has a diameter of about ¼ inch, and fluid tube 18 has a diameter of about ⅜ inch. In this manner, fluid tubes 14, 16, and 18 are configured such that the cross section increases from the upstream to the downstream side.

In three fluid tubes 14, 16, and 18, the organic solvent flowing within fluid tube 14 is substantially in a liquid state, the organic solvent flowing within fluid tube 16 is in a liquid-vapor mixed state, and the organic solvent flowing within fluid tube 18 is substantially in a vapor state. As such, the diameters of fluid tubes 14, 16, and 18 are set so that the cross sections of the tubes correspond to the volumes of the organic solvent states flowing within the tubes. Thus, the organic solvent is efficiently heated in each of fluid tubes 14, 16, and 18.

The fluid tubes are not limited to the above-mentioned three fluid tubes 14, 16, and 18. Another example for the fluid tube may include a folding-fan shape whose cross section gradually increases in the downstream direction.

Halogen lamp heaters 20, 22, and 24 are surrounded by helical fluid tubes 14, 16, and 18, respectively, and extend almost rectilinearly along the lengthwise direction of cylindrical vessel 12 (the horizontal direction in FIG. 2).

As shown in FIG. 2, a heat insulator 26 is attached on the inner circumferential surface of cylindrical vessel 12. Also, both opening end portions of cylindrical vessel 12 are blocked up by end members 12a and 12b with heat insulator 26 attached thereto.

As shown in FIG. 2, the upstream end portion of fluid tube 14 penetrates one end member 12a of cylindrical vessel 12, thereby forming an inlet 34 for the fluid. Also, the downstream end portion of fluid tube 18 penetrates the other end member 12b of cylindrical vessel 12, thereby forming an outlet 36 for the fluid. Then, the fluid transferred into cylindrical vessel 12 through inlet 34 flows through fluid tubes 14, 16, and 18, in order, and is discharged through outlet 36.

Inlet 34 is connected to a liquid organic solvent supply tube 30a, which is connected to a liquid organic solvent supply source 30. The liquid organic solvent is sent from liquid organic solvent supply source 30 to inlet 34 via liquid organic solvent supply tube 30a. As shown in FIG. 2, liquid organic solvent supply tube 30a has a valve 30b interposed therein, and valve 30b controls the supply of the organic solvent liquid from liquid organic solvent supply source 30 to inlet 34.

Liquid organic solvent supply source 30, liquid organic solvent supply tube 30a, and valve 30b constitute a liquid organic solvent supply device for supplying the organic solvent liquid to fluid tube 14 via inlet 34.

An inert gas supply source 32 for supplying an inert gas, such as N2 gas (nitrogen gas) is provided. Inert gas supply source 32 is connected to an inert gas supply tube 32a. Inert gas supply tube 32a branches off into a first branch tube 32b and a second branch tube 32c. First branch tube 32b is connected to liquid organic solvent supply tube 30a. As shown in FIG. 2, first branch tube 32b has a valve 32d interposed therein, and valve 32d controls the supply of the inert gas from inert gas supply source 32 to liquid organic solvent supply tube 30a. Meanwhile, second branch tube 32c branches off from inert gas supply tube 32a and connects to a connecting pipe 17 between fluid tubes 16 and 18.

Herein, inert gas supply source 32, inert gas supply tube 32a, and second branch tube 32c constitute an inert gas supply device for supplying the inert gas to connecting pipe 17. When the organic solvent liquid is supplied from liquid organic solvent supply source 30 to inlet 34, the inert gas is supplied from inert gas supply source 32 to connecting pipe 17 thereby mixing with the organic solvent vapor in connecting pipe 17. The mixed fluid of organic solvent vapor and inert gas is then sent to fluid tube 18, and is finally discharged from outlet 36.

Inert gas supply source 32, inert gas supply tube 32a, first branch tube 32b, and valve 32d constitute a purging inert gas supply device for supplying the inert gas to fluid tube 14 via inlet 34. After generating the organic solvent vapor by evaporating the organic solvent liquid, valve 32d is opened, thereby supplying inert gas to fluid tube 14 via inlet 34. Through this inert gas, the organic solvent remaining within fluid tubes 14, 16, and 18 is discharged from fluid tube 18 via outlet 36. The above mentioned purging inert gas supply device removes the organic solvent remaining within fluid tubes 14, 16, and 18, and keeps the inside of fluid tubes 14, 16, and 18 clean.

While discharging the organic solvent remaining within fluid tubes 14, 16, and 18, inert gas from inert gas supply source 32 may be sent to both first branch tube 32b and second branch tube 32c. The organic solvent remaining within fluid tubes 14, 16, and 18 is discharged by the inert gas. Each of halogen lamp heaters 20, 22, and 24 may heat the inert gas passing through the inside of each of fluid tubes 14, 16, and 18, and the heated inert gas is discharged from outlet 36 into a chamber of a substrate processing apparatus (which will be described later).

In order to heat and transfer the inert gas into the chamber of the substrate processing apparatus, the following method may also be used. First, valve 32d is opened to supply the inert gas to fluid tube 14 via inlet 34, discharging the organic solvent remaining within fluid tubes 14, 16, and 18 via outlet 36 by the inert gas. Next, valve 32d is closed, thereby supplying the inert gas connecting pipe 17 from inert gas supply source 32 via second branch tube 32c. Halogen lamp heater 24 heats the inert gas passing through the inside of fluid tube 18, and the heated inert gas is discharged from outlet 36. In this case, while heating the inert gas, halogen lamp heaters 20 and 22 may be turned off, reducing the consumption of power.

An additional valve may be interposed in second branch tube 32c. In the case where the valve is provided in second branch tube 32c, when the inert gas is not supplied to connecting pipe 17 via second branch tube 32c from inert gas supply source (32), closing the valve may prevent the organic solvent vapor from flowing into second branch tube 32c or inert gas supply tube 32a from connecting pipe 17.

According to the evaporator of the present embodiment, the heating unit for fluid tubes 14, 16 and 18 is not limited to halogen lamp heater 20, 22, and 24 as shown in FIG. 2. For example, as shown in FIG. 3, an induction-heating type heater may be used. Herein, fluid tube 14 from among three fluid tubes 14, 16, and 18 is provided as an example. In FIG. 3, fluid tube 14 is helical, made of stainless steel, and surrounded by a coil 52 with an insulator 50 interposed between helical fluid tube 14 and coil 52. High frequency power is applied to coil 52 by a high frequency power supply 54, inducing electromotive force in helical fluid tube 14 in a direction (to the left in FIG. 3) against to the magnetic field of coil 52. The induced current in fluid tube 14 then produces Joule heating. Fluid tube 14 may be heated by the Joule heating. In this manner, an induction-heating type heater including coil 52 and high frequency power supply 54 may be used to heat fluid tube 14.

As another example of a heating unit for fluid tubes 14, 16, and 18, a resistance-heating type heater may be used, as shown in FIG. 4. Herein, fluid tube 14 from among three fluid tubes 14, 16, and 18 is shown as an example. Fluid tube 14, extending almost rectilinearly, is surrounded by a resistance-heating type heater 56, such as a band-type ribbon heater, rubber heater, or tube-type ceramic heater. Resistance-heating type heater 56 causes electric current to flow in a heating conductor 56a, such as nichrome wire, thereby generating heat. Herein, even though resistance-heating type heater 56 is wound around fluid tube 14, a gap may occur between fluid tube 14 and resistance-heating type heater 56. For this reason a thermally conductive member 58 may be provided.

Hereinafter, the operation of evaporator 10 as shown in FIGS. 1 and 2 will be described.

First, when the valve 30b is opened, liquid organic solvent supply source 30 supplies liquid organic solvent to inlet 34 via liquid organic solvent supply tube 30a. Then, halogen lamp heaters 20, 22, and 24 heat fluid tubes 14, 16, and 18, respectively. Inert gas supply source 32 supplies inert gas to connecting pipe 17 via inert gas supply tube 32a and second branch tube 32c. At this time, valve 32d is closed.

The organic solvent liquid sent to fluid tube 14 is heated within fluid tube 14. Herein, the organic solvent is in a liquid state within fluid tube 14. The heated organic solvent liquid is sent to fluid tube 16 via connecting pipe 15, and is further heated within fluid tube 16. Herein, the organic solvent is in a liquid-vapor mixed state at the upstream area of fluid tube 16, and the organic solvent is in a vapor state at the downstream area of fluid tube 16 (see FIG. 1).

In connecting pipe 17, the organic solvent vapor from fluid tube 16, and the inert gas from second branch tube 32c are mixed with each other. The mixed fluid of organic solvent vapor and inert gas is sent to fluid tube 18, and further heated within fluid tube 18. Herein, the organic solvent is in a vapor state within fluid tube 18. Then, the mixed fluid of organic solvent vapor and inert gas is discharged via outlet 36.

As described above, after the process of generating the organic solvent vapor by evaporation of the organic solvent liquid, in order to remove the excess organic solvent from fluid tubes 14, 16, and 18, valve 32d is opened to supply the inert gas to inlet 34 from inert gas supply source 32 via inert gas supply tube 32a and first branch tube 32b. The inert gas discharges the remaining organic solvent within fluid tubes 14, 16, and 18 from fluid tube 18 via outlet 36. In this manner, the remaining organic solvent within fluid tubes 14, 16, and 18 are removed and the inside of fluid tubes 14, 16, and 18 remain clean.

As described above, according to evaporator 10 and the evaporation method of the present embodiment, since the organic solvent liquid supplied to fluid tube 14 is not mixed with the inert gas, the concentration of the organic solvent vapor generated within fluid tubes 14, 16, and 18 can be increased. Fluid tubes 14, 16, and 18 are configured in such a manner that their cross sections increase from one end to the other end (that is, from the upper stream side to the lower stream side). Accordingly, during the evaporation process the organic solvent liquid is not mixed with the inert gas within fluid tubes 14 and 16, and even though the volume of the organic solvent increases, it is possible to increase the thermal efficiency of the organic solvent in various states, such as in the liquid state, the mixed state of liquid and vapor, and the vapor state (see FIG. 1). Accordingly, the organic solvent can be efficiently heated.

The inert gas is supplied to connecting pipe 17 between fluid tubes 16 and 18, and the mixed organic solvent vapor and inert gas are discharged from outlet 36 on the downstream side of fluid tube 18. Herein, when the organic solvent vapor is condensed on a wafer W, the volume of the organic solvent will decrease, thereby suddenly lowering the pressure within the chamber of the substrate processing apparatus (which will be described later). When the pressure is lowered, it is necessary to make the chamber or chamber internal members strongly resistant to pressure changes. However, according to the above-described method, mixing the organic solvent vapor with a predetermined amount of inert gas inhibits the sudden pressure lowering caused by the condensation of the organic solvent.

Also, after the process of generating the organic solvent vapor by evaporating the organic solvent liquid, the inert gas is supplied to inlet 34 on the upstream portion of fluid tube 14. Due to the inert gas, the organic solvent remaining within fluid tubes 14, 16, and 18 is discharged from outlet 36 at the downstream portion of fluid tube 18. Accordingly, after the generation of the organic solvent vapor by evaporator 10, when the use of evaporator 10 is finished, the inside of fluid tubes 14, 16 and 18 are kept clean.

Figure 5:
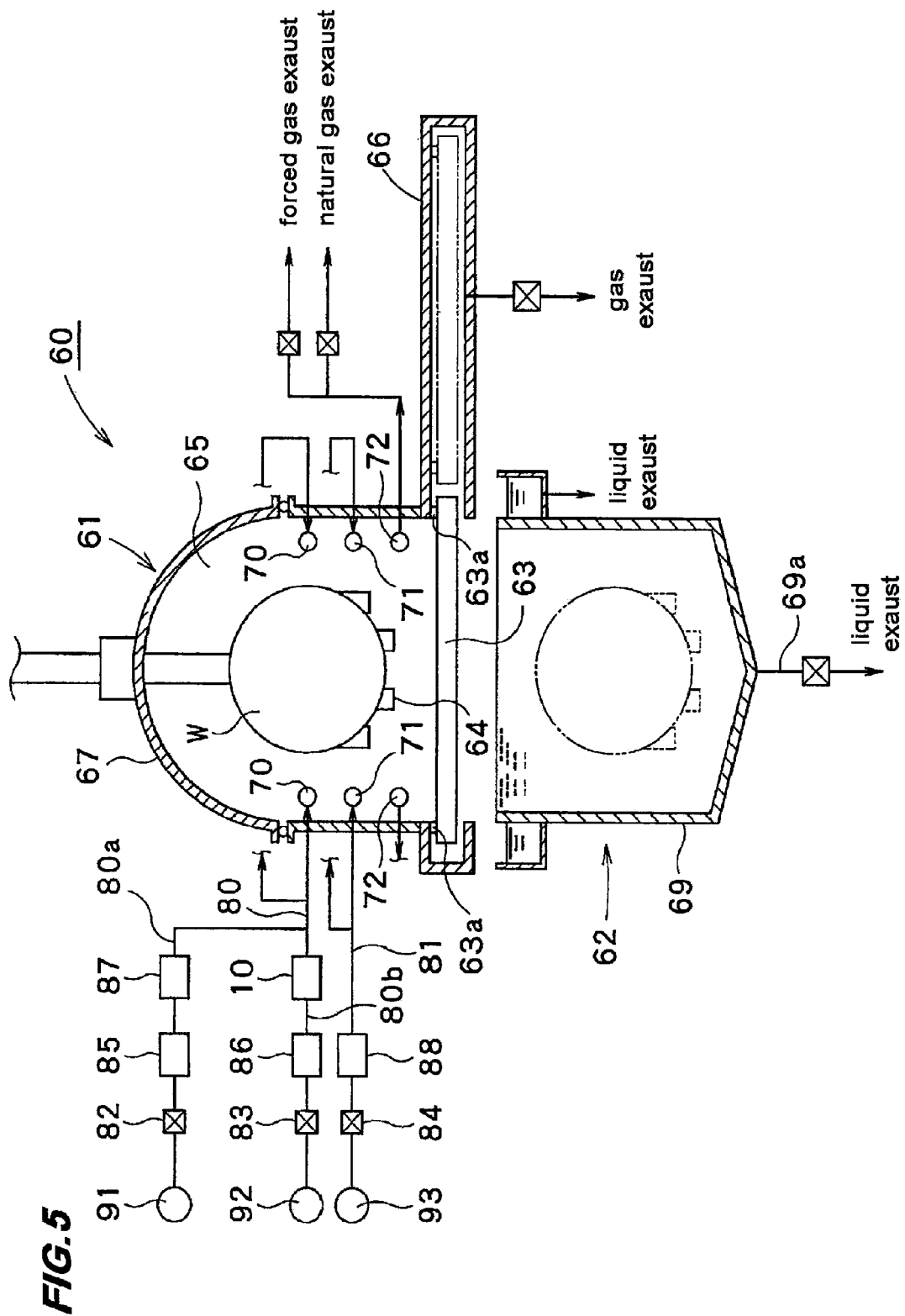
FIG. 5 schematically shows the configuration of a substrate processing apparatus according to one embodiment of the present invention.

Hereinafter, a substrate processing apparatus 60 including evaporator 10 as shown in FIG. 1 will be described with reference to FIG. 5. FIG. 5 schematically shows the configuration of substrate processing apparatus 60 according to one embodiment of the present invention.

Substrate processing apparatus 60, as shown in FIG. 5, includes a liquid treatment unit 62 for performing chemical-solution treatment or a washing process on a wafer W, and a drying unit 61, provided at the upper side of liquid treatment unit 62, for drying wafer W after subjecting it to the washing process in liquid treatment unit 62. Herein, liquid treatment unit 62 is set to treat wafer W with a predetermined chemical solution [for example, diluted hydrofluoric acid (DHF), ammonia-hydrogen peroxide mixture (APF), sulfuric acid-hydrogen peroxide mixture (SPM)], and to then perform the washing process by deionized water (DIW). Substrate processing apparatus 60 may include a wafer guide 64 capable of holding multiple (for example, 50) wafers W. Wafer guide 64 is movable (upward/downward) between liquid treatment unit 62 and drying unit 61. Above substrate processing apparatus 60, a fan filter unit (FFU, not shown) is disposed, which supplies clean air to substrate processing apparatus 60 as down flow.

As shown in FIG. 5, liquid treatment unit 62 includes a reservoir 69 for storing the chemical solution or DIW. The chemical solution and DIW are alternately stored in reservoir 69, and the chemical-solution treatment or washing process of wafer W can be carried out by immersing wafer W in the chemical solution or DIW, respectively.

Drying unit 61 includes a chamber 65 for receiving wafer W, and a chamber wall 67, which forms chamber 65 therein.

The atmospheres around reservoir 69, and chamber 65 can be separated from or can communicate with each other by a horizontally slidable shutter 63, disposed between reservoir 69 and chamber 65. When liquid treatment is performed in reservoir 69 of liquid treatment unit 62, or when wafer guide 64 moves wafer W between reservoir 69 and chamber 65, shutter 63 is housed in a shutter box 66, thereby communicating the atmosphere around reservoir 69 with the atmosphere of chamber 65. Otherwise, when shutter 63 is disposed beneath chamber 65, a seal ring 63a, provided on the top surface of shutter 63, contacts the lower end of chamber wall 67, tightly blocking up the bottom opening of chamber 65.

A fluid nozzle 70 that supplies water vapor, IPA (isopropyl alcohol) vapor, or mixture thereof into chamber 65 is disposed within chamber 65. Fluid nozzle 70 is connected to a pipe 80, which branches off into pipes 80a and 80b. The branched-off pipes are connected to a DIW supply source 91 and an IPA supply source 92, respectively. A predetermined amount of DIW is sent to a heater 87 by opening an open/close valve 82 provided on pipe 80a, and controlling a flow control valve 85. Then, DIW is heated in heater 87, thereby generating water vapor. Likewise, a predetermined amount of liquid of IPA is sent to evaporator 10 by opening an open/close valve 83 provided on pipe 80b, and controlling a flow control valve 86. The liquid IPA is heated in evaporator 10, thereby generating IPA vapor. The water vapor, IPA vapor, or mixture thereof (which is mixed in pipe 80) is sprayed into chamber 65 from fluid nozzle 70.

An N2 gas nozzle 71 for spraying N2 gas (nitrogen gas), heated to a predetermined temperature, to chamber 65 is provided within chamber 65. As shown in FIG. 5, N2 gas in room temperature is supplied from an N2 gas supply source 93 to a heater 88 by releasing an open/close valve 84. The N2 gas is heated to a predetermined temperature by heater 88, and the heated N2 gas is sprayed into chamber 65 from N2 gas nozzle 71 via an N2 gas supply line 81.

A gas exhaust nozzle 72, for discharging atmospheric gas within chamber 65, is disposed within chamber 65. Gas exhaust nozzle 72 includes a natural gas exhaust line for performing natural gas exhaustion from the inside of chamber 65, and a forced gas exhaust line for performing forced gas exhaustion from the inside of chamber 65.

Hereinafter, a method for processing a wafer W using the above-described substrate processing apparatus 60 will be described.

First, shutter 63 separates reservoir 69 of liquid treatment unit 62 and chamber 65 of drying unit 61 from each other. Also, the inside of chamber 65 is filled with N2 gas, and the internal pressure is set to be equal to atmospheric pressure. Meanwhile, a predetermined chemical solution is stored in reservoir 69, while wafer guide 64 is disposed within chamber 65 of drying unit 61.

Then, the supply of N2 gas into chamber 65 is stopped, and 50 wafers W are transferred from an external substrate-carrying device (not shown) to wafer guide 64. Next, forced gas exhaustion is performed from gas exhaust nozzle 72, while shutter 63 is slid such that reservoir 69 and chamber 65 communicate with each other.

Wafer guide 64 is then moved down, thereby immersing the held wafer W in the chemical solution stored in reservoir 69 for a predetermined time period. After the completing the chemical solution treatment of wafer W, it is immersed in reservoir 69, while DIW is fed into the reservoir, replacing the chemical solution, and washing wafer W. The replacement of the chemical solution by the DIW in reservoir 69 may occur by discharging the chemical solution via a drainage tube 69a from, and then supplying the DIW to reservoir 69.

After completing the chemical solution treatment and washing process of wafer W, the gas exhaust from chamber 65 is converted from the forced gas exhaust line into the natural gas exhaust line. N2 gas nozzle 71 supplies N2 gas, heated to a predetermined temperature to chamber 65, and maintains an atmosphere of, heated N2 gas in chamber 65. This warms up the inside of chamber 65 and chamber wall 67, so that when IPA vapor is supplied into chamber 65 later, dew condensation of the IPA vapor on chamber wall 67 is inhibited.

After the supply of the heated N2 gas into chamber 65, fluid nozzle 70 supplies water vapor, filling the inside of chamber 65 with water vapor atmosphere. Then, in order to receive wafer W within chamber 65, wafer guide 64 begins to be pulled up. Wafer W is not dried during being pulled up to the space filled with water vapor, and thus watermarks are not formed on wafer W.

Wafer guide 64 is stopped once wafer W is housed in chamber 65, and shutter 63 is closed to separate reservoir 69 and chamber 65 from each other. Also, when wafer W reaches a predetermined position within chamber 65, fluid nozzle 70 introduces IPA vapor into chamber 65. Thus, IPA replaces DIW on the surface of wafer W. Herein, since the surface tension of the liquid on wafer W changes slowly, the liquid film thickness is uniform. Also, since the balance of surface tension applied to the convex portion of the circuit pattern on wafer W is not easily lost, it is possible to avoid the occurrence of pattern collapse. Finally, the surface of wafer W is dried substantially at the same time, thereby suppressing the formation of watermarks.

Once an IPA liquid film is formed on the surface of wafer W after supplying the IPA vapor for a predetermined time period, the supply of the IPA vapor into chamber 65 is stopped and wafer W is dried through a drying process. For example, the drying process may include evaporating IPA from the surface of wafer W by supplying N2 gas heated up to a predetermined temperature into chamber 65, and cooling wafer W down to a predetermined temperature by supplying with N2 gas at room temperature into chamber 65.

In such a drying process, IPA on the surface of wafer W can be uniformly evaporated. Thus, the balance of surface tension applied to the convex portion of a circuit pattern on wafer W is not easily lost, which inhibits the occurrence of pattern collapse. Also, since wafer W is dried from a state where only IPA exists on the surface, the formation of watermarks is prevented.

When the drying process of wafer W is completed, a substrate-carrying device (not shown) from outside accesses wafer guide 64 to take out wafer W from substrate processing apparatus 60. In this manner, a series of processes on wafer W in substrate processing apparatus 60 are completed.

The above-described substrate processing apparatus 60 includes evaporator 10 as shown in FIG. 1, and thus can increase concentration of IPA vapor generated by evaporator 10. For this reason, the adsorption rate of IPA vapor on wafer W increases, shortening drying time of wafer W, and reducing the usage amount of IPA.

From the foregoing, it is noted that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An evaporator for evaporating an organic solvent comprising:

a fluid tube including at least a first fluid tube part and a second fluid tube part, each of the first fluid tube part and the second fluid tube part being a helical shape, and the second fluid tube part being connected at a downstream side of the first fluid tube part through connecting pipe;

a liquid organic solvent supply device configured to supply only organic solvent liquid to one end of the first fluid tube part; and a heating unit disposed inside each of the helical shape of the first fluid tube part and the second fluid tube part in such a way that the center of the heating unit approximately coincides with the center of the first fluid tube part and the second fluid tube part, and configured to heat each of the first fluid tube part and the second fluid tube part independently such that the organic solvent liquid is maintained substantially at a liquid state in the first fluid tube part and at a liquid/vapor mixed state in the second fluid tube part, wherein the first fluid tube part is designed to have a first cross section suitable for the liquid state and the second fluid tube part is designed to have a second cross section larger than the first cross section suitable for the liquid/vapor mixed state, and the organic solvent liquid supplied to the one end of the second fluid tube part is heated to be discharged as an organic solvent vapor from the other end of the second fluid tube part without being mixed with an inert gas.

2. The evaporator as claimed in claim 1, wherein the fluid tube further comprises:

a third fluid tube part connected at a downstream side of the second fluid tube part having a third cross section larger than the second cross section, wherein the third fluid tube part is heated independently such that the vapor state organic solvent supplied from the second fluid tube part is maintained at a vapor state in the third fluid tube part and the organic solvent vapor is discharged from a downstream side of the third fluid tube part.

3. The evaporator as claimed in claim 2, further comprising an inert gas supply device connected between the second fluid tube part and the third fluid tube part, and configured to supply an inert gas to the third fluid tube part, wherein the organic solvent vapor and the inert gas are discharged in a mixed state from the other end of the third fluid tube part.

4. The evaporator as claimed in claim 3, wherein the inert gas is nitrogen gas.

5. The evaporator as claimed in claim 3, further comprising a purging inert gas supply device to supply the inert gas to the one end of the fluid tube, wherein the inert gas supplied from the purging inert gas supply device to the fluid tube discharges the organic solvent remaining within the fluid tube from the fluid tube.

6. The evaporator as claimed in claim 5, wherein the inert gas is nitrogen gas.

7. The evaporator as claimed in claim 1, wherein the organic solvent comprises isopropyl alcohol.

8. The evaporator as claimed in claim 1, wherein the heating unit comprises a lamp heater.

9. The evaporator as claimed in claim 1, wherein the heating unit comprises an induction-heating type heater.

10. The evaporator as claimed in claim 1, wherein the heating unit comprises a resistance-heating type heater.

11. A substrate processing apparatus for processing a substrate, the substrate processing apparatus comprising: the evaporator as claimed in claim 1; and a chamber for receiving the substrate and drying the received substrate, wherein the chamber is supplied with organic solvent vapor generated by the evaporator.

* * * * *